Feb. 10, 1953     C. F. SELLERS     2,627,727
GEOPHYSICAL PROSPECTING DEVICE

Filed Oct. 22, 1946     3 Sheets—Sheet 1

INVENTOR.
C. F. SELLERS
BY Lester B. Clark
& Ray L. Smith
ATTORNEYS

Feb. 10, 1953 C. F. SELLERS 2,627,727
GEOPHYSICAL PROSPECTING DEVICE
Filed Oct. 22, 1946 3 Sheets-Sheet 2

C. F. SELLERS
INVENTOR.
BY Lester B. Clark
& Ray L. Smith
ATTORNEYS

Feb. 10, 1953  C. F. SELLERS  2,627,727
GEOPHYSICAL PROSPECTING DEVICE
Filed Oct. 22, 1946  3 Sheets-Sheet 3

C. F. SELLERS
INVENTOR.
BY Lester B Clark
Ray L. Smith
ATTORNEYS

Patented Feb. 10, 1953

2,627,727

UNITED STATES PATENT OFFICE 2,627,727

GEOPHYSICAL PROSPECTING DEVICE

Clemille F. Sellers, El Banco, Colombia, South America, assignor to Robt. H. Ray, Inc., a corporation of Texas Application October 22, 1946, Serial No. 704,861

2 Claims. (Cl. 61—69)

This invention relates to geophysical prospecting, and more particularly to devices for obtaining prospecting data in submerged areas to ascertain the location and extent of subsurface geological structures favorable to the location of valuable deposits such as oil, gas, and the like.

In geophysical prospecting in water covered areas, as by means of the gravity meter, the magnetometer, and like instruments, it is imperative that conditions of stability be established so that proper instrument adjustments and subsequent readings from the instrument may be had. Where the submerging medium is shallow, it has been proposed to establish suitable supports resting upon the submerged surface and possessing sufficient stability that readings can be had from an instrument supported thereon and above the water. This procedure and the equipment used are entirely inadequate when the water is rough, and cannot be used at all when the water is of considerable depth.

The present invention is intended to enable the use of any conventional prospecting instrument, particularly the gravity meter, by lowering the instrument together with an operator to a submerged surface where a stable condition is established, and the desired observations are made with facility and accuracy. More specifically the invention comprehends the provision of a submersible chamber or bell which may be lowered from a water borne vessel, a prospecting instrument, and operator being housed within such enclosure, and facilities being provided so that coordinated control of lifting and lowering of the device can be maintained.

An important object of the invention is to provide prospecting means which enables facility and accuracy in obtaining information concerning geological structures underlying water submerged surfaces.

Another object is to provide a device of the class herein described that will enable the obtaining of instrument readings at submerged surfaces regardless of the depth of the submerging medium.

Another and more specific object of the invention is to provide a submersible chamber or bell adapted to enclose a prospecting instrument and an operator therefor, and lowerable to a stable position upon a submerged surface where observations are to be made.

Still another object of the invention is to provide a completely enclosed submersible chamber or bell, including means for controlling the buoyancy thereof to facilitate raising and lowering of the device, and to establish stability thereof upon a submerged surface.

It is also an object to provide a submersible chamber or bell having a depending skirt and means cooperating therewith to facilitate the entry of water into such skirt and the breaking away of the chamber from bottom when the bell is to be lifted from the submerged surface.

The foregoing objects together with other objects and advantages of the invention will be more fully apparent from the following description considered in connection with the accompanying drawings in which—

Figure 1:
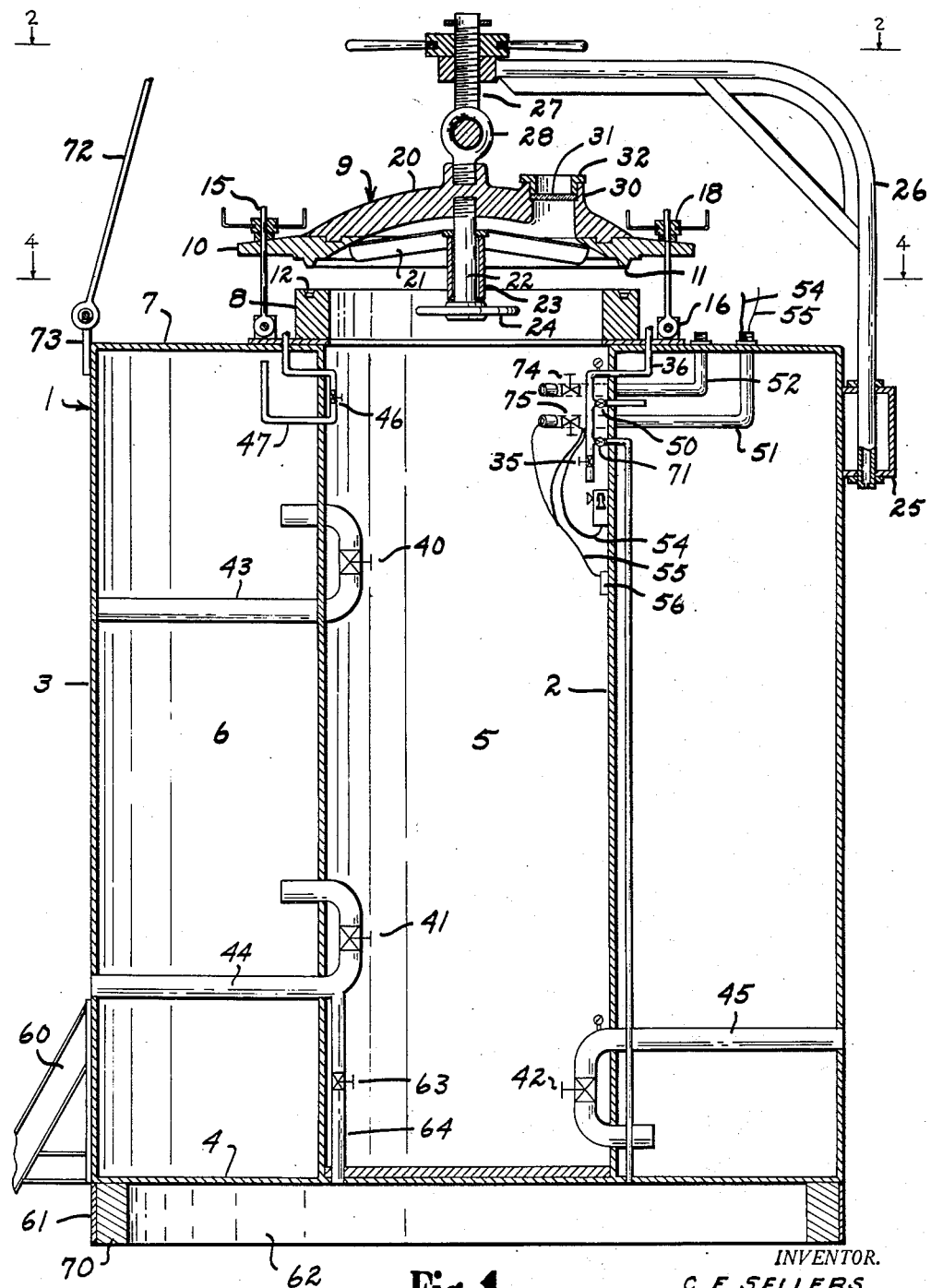
Fig. 1 is a vertical sectional view through a bell embodying the invention.
Figure 2:
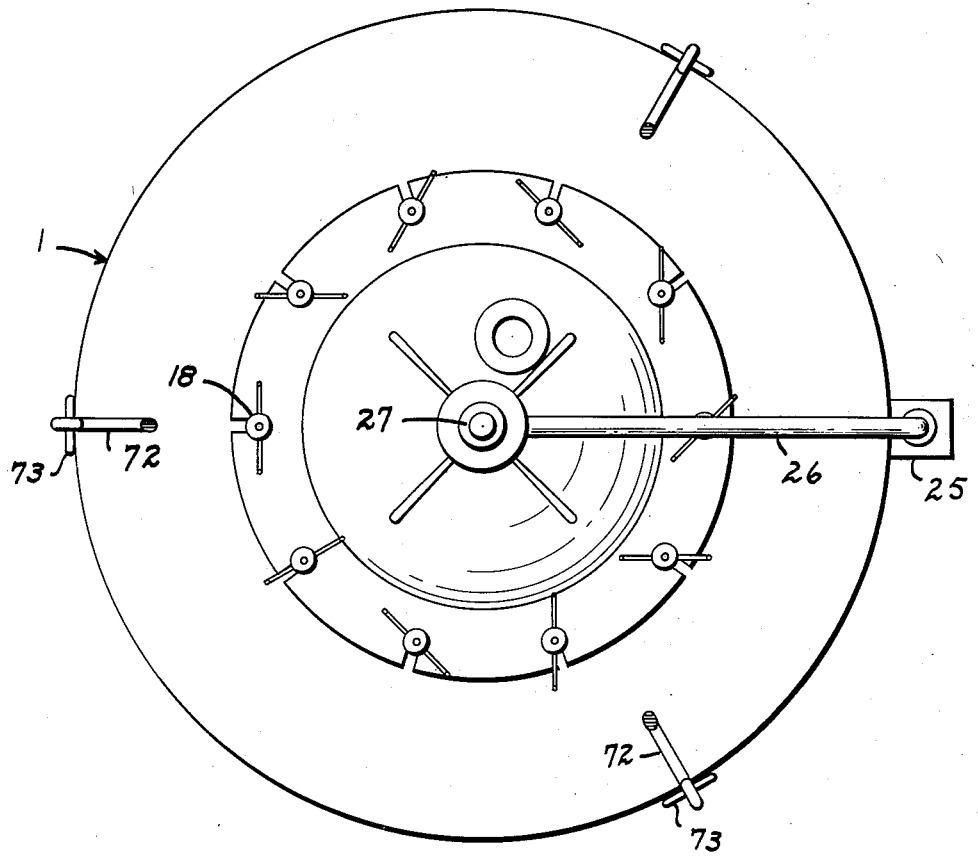
Fig. 2 is a plan view of the bell taken on line 2—2 in Fig. 1.
Figure 3:
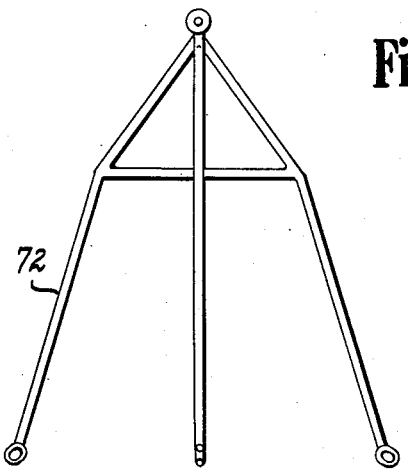
Fig. 3 is a detail showing the lifting bail.
Figure 4:
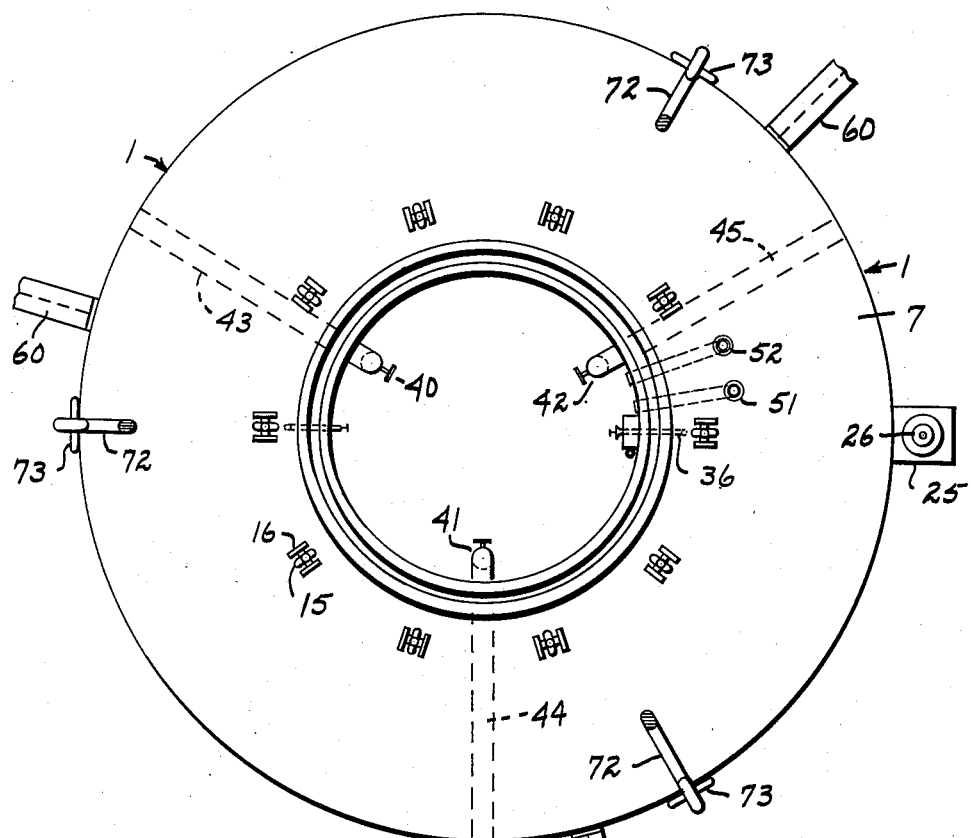
Fig. 4 is a horizontal view taken on line 4—4 in Fig. 1.
Figure 5:
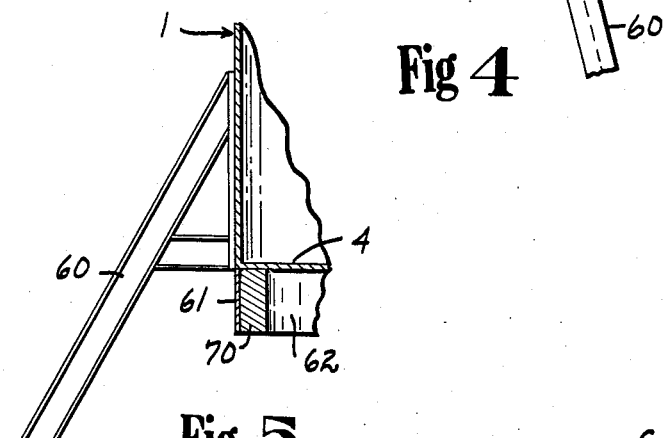
Fig. 5 is a detail showing the arrangement of the bell skirt, weighting elements for the bell, and the tripod legs which are used in some cases where prospecting is carried out upon oozy submerged surfaces.

Except as otherwise qualified, the term "submersible chamber" or the word "bell" as used herein comprehends an enclosure for an operator and a prospecting instrument, lowerable to rest upon a submerged surface so that direct readings may be made with the instrument at that surface.

Referring to the drawings, a submersible chamber or bell embodying the invention is shown at 1 and comprises inner and outer concentric tubes 2 and 3 closed at their lower ends by a plate 4 whereby there is formed an inner operating chamber 5 and an outer floodable chamber 6. The inner chamber 5 provided space for the operator and the instrument, such as a gravity meter, magnetometer, and the like, and also houses the various controls accessible to the operator.

The chamber 6 is closed at its top by the annular cover plate 7 which is surmounted by a ring 8 about the upper end of the tube 2. A cover assembly 9 includes annulus 10 having lip 11 complementary to a groove 12 in the ring 8, it being intended that the interfitting of the lip and groove with suitable packing therebetween shall form a seal when the assembly is secured in place by eye-bolts 15 pivoted in ears 16 on the cover plate 7. These eye-bolts may be swung to a vertical position to enter slots 17 in the annulus 10 so that tightening of the winged nuts 18 on the exterior of the chamber will effectively close the chamber 5 against the intrusion of water when the device is submerged.

In order that the operator within the chamber 5 may have means of escape from within the chamber, the assembly 9 includes the cover plate 20 which fits sealably upon the annulus 10 and is releasably held in place by the spider assembly 21 arranged about the shaft 22 upon collar 23 which is releasably held in place by the hand wheel 24 upon the shaft. The arms 21 may obviously be released from engagement on the nether side of the annulus 10 by rotation of the hand wheel whereby the cover plate may be moved from its position to provide egress from within the chamber 5.

A bracket 25 on the side of the bell 1 supports the davit 26 provided with a jack screw 27 at its inner end engageable with the eye 28 located centrally on the exterior of the cover assembly 9.

Suitably located upon the cover plate 20 is a boss 30 which is closed by a transparent window 31 held in place by the gland member 32.

Ordinarily the cover assembly 9 will be handled by means of the davit construction to place the assembly in closing position or to remove it from such position. Such operation is carried out from the exterior of the bell. If, however, for any reason it becomes necessary for the operator within the chamber 5 to provide egress of his own volition, the cover plate 20 may be removed by actuating the wheel 24 and then dislodging the cover plate from its position.

If there is considerable pressure on the exterior of the bell at such time, the removal of the cover plate 20 may be facilitated by actuating the valve 35 in the conduit 36 which is connected to a source of high pressure supplied from the vessel with which the bell is used. This provides a super-atmospheric pressure within the chamber 5 and enables the operator to emerge through the opening provided by removal of the cover plate 20 together with a bubble of air which will emerge from the chamber.

The chamber 6 may be flooded at will by operation of any one of the valves 40, 41, and 42 in conduits 43, 44, and 45, which conduits open at their opposite ends to the exterior of the bell and the interior of the chamber 6 respectively. In event one of such valves is opened, the air entrapped within the chamber 6 is released by operation of the valve 46 whereby such air is conducted from the interior of the chamber to the opening of the pipe 47 at the top of the bell.

It is to be noted that the conduits 43, 44, and 45 are so arranged that their innermost ends are at different elevations. This arrangement permits selective unwatering of the chamber. Such unwatering is effected by opening the valve 50 in the high pressure line 36 to admit air to the upper end of the chamber 6. If then, for example, the valve 40 is opened, water will be forced from within the chamber through conduit 43 until the water level falls to the inner end of the conduit whereupon further admission of air will only result in the flow of such air outwardly in the form of bubbles in the submerging medium, thus indicating that unwatering has progressed until a predetermined level within the chamber 6 has been reached. Similar additional unwatering may be effected by utilization of the valves 41 and 42.

Unwatering of the chamber 6 varies the buoyancy of the valve and thereby assists in controlling the lowering or the lifting of the bell, and also in breaking away from bottom as will more fully appear.

In some cases, particularly where prospecting is being carried out in relatively shallow water, the atmosphere within the chamber 5 may be relied upon to supply the needs of the operator during the making of a given observation. Such atmosphere may be supplemented by a supply of oxygen under the control of the operator and, if desired, a desiccant and a carbon dioxide absorber may be enclosed within the chamber. It is preferred, however, to provide for the circulation of air from the surface to and from the chamber, and for this purpose there are provided air inlet and outlet conduits 51 and 52, such conduits being connected to air lines leading to suitable control equipment at the surface. The air inlet conduit 51 serves also as a cable conduit for conductors such as 54 and 55 to provide telephonic communication with the surface and to supply electrical energy to the outlet box 56 whence such energy can be distributed as desired for lighting and other purposes within the chamber.

Stability of the bell 1 is an important characteristic and features above explained to attain this characteristic are supplemented by the provision of tripod legs 60 secured to the bell by any suitable method such as welding. When the submerged surface is relatively hard or rigid the weight of the bell will rest upon these tripod legs. If on the other hand, the surface is oozy as is frequently the case, the tripod legs will enter such surface to such an extent that a skirt 61 on the lower end of the bell will likewise enter the surface. This skirt provides an inverted chamber 62 into which air is trapped as the bell is lowered within the submerging medium. Such air may be exhausted by operation of the valve 63 in conduit 64 which opens at its lower end within the chamber. The suction effected by means of this construction likewise assists in stabilizing the bell when on location upon the submerged surface.

Stability is also enhanced by maintaining a low center of gravity in the bell. A weight 70 secured to the inner surface of the skirt 61 assists in accomplishing this purpose. This weight may comprise a cast metal and is preferably of lead.

When it is desired to lift the bell from the surface upon which it is positioned, while an observation is being made, the suction occurring by virtue of the skirt 61 and the chamber 62 formed thereby may be broken by operating the valve 71 in the high pressure line whereby air is admitted under high pressure to the chamber 62. Such admission of air together with unwatering operations to increase the buoyancy of the bell, as above explained, enable lifting of the complete bell through the application of desired lifting force upon the bail 72 secured to ears 73 attached to the upper end of the bell.

The operation of the device of the invention is believed apparent from the foregoing description. By way of summary and further explanation of the invention, it is assumed that suitable equipment is provided aboard an accompanying vessel to provide adequate hoisting effort, air pressures, and electrical energy. The cover assembly 9 is removed by means of the davit 26 for entrance of the operator together with the prospecting instrument with which observations are to be made. The cover assembly is then positioned upon the ring 8 and secured in place by tightening of the nuts 18 whereupon the entire bell is lowered by means of the bail 72 to location upon the submerged surface at which observations are to be made.

The valves 73 and 74 in the air lines 51 and 52 are normally maintained open and air is circulated through these valves and the associated conduits in sufficient quantity to supply the needs of the operator within the chamber 5. Likewise, adequate air pressure is provided to the conduit 36 for performing the various functions required of such air pressure.

Buoyancy of the bell is decreased in the manner above explained by opening any one of the valves 40, 41, or 42, and at the same time opening the valve 46 so that entrapped air may be released from within the chamber 6. Obviously this watering of the chamber 6 can be continued to any desired extent. The lowering operation is continued until the bell is in position upon bottom. If the submerged surface is of such nature that the tripod legs 60 enter therein, until the skirt 61 engages the surface, the valve 63 may be opened to exhaust air from within the inverted chamber 62 whereby stable conditions of the bell upon the submerged surface are obtained. Necessary observations are then made by the operator within the chamber 5.

When the device is to be lifted from the submerged surface, hoisting effort is applied to the bail 72. At the same time the valve 71 is opened to admit air to the chamber 62 to assist in breaking the suction existing by virtue of the intimate contact of the submerged surface with the interior of the chamber 62. At the same time, desired buoyancy may be effected by admitting high pressure air pressure through the valve 50 to the interior of the chamber 6 while one or more of the valves 40, 41, and 42 are opened.

In event an emergency escape from within the chamber 52 is necessary, the valves 73 and 74 may be closed and super-atmospheric pressure introduced to the interior of the chamber 5 through operation of the valve 35. The hand wheel 24 may then be rotated to release the cover plate 20 whereupon such cover plate may be removed to permit egress of the operator from within the chamber 5.

Broadly the invention comprehends apparatus for geophysical prospecting in water submerged areas, such apparatus enabling the obtaining of information concerning subsurface geological structures favorable to the location of valuable deposits such as oil, gas, and the like.

The invention claimed is:

1. Apparatus for making geophysical measurements in water covered areas comprising, a submersible bell adapted to be lowered to and rest upon the submerged surface, there being a chamber within said bell to accommodate the geophysical instrument and the operator therefor to obtain geophysical measurements when the bell is on bottom, a removable closure for said bell for ingress and egress of the operator and instrument when the bell is lifted to the surface of the submerging medium, a weighted skirt extending downwardly from the bell to enter the submerged surface and stabilize the bell during the taking of geophysical measurements, and a combination support and anchor means secured to said bell and extending outwardly and downwardly adjacent said skirt, said means comprising tripod legs adapted to enter the submerged surface and anchor said bell during the taking of geophysical readings.

2. Apparatus for making geophysical measurements in water covered areas comprising, a submersible bell adapted to be lowered to and rest upon the submerged surface, there being a chamber within said bell to accommodate the geophysical instrument and the operator therefor to obtain geophysical measurements when the bell is on bottom, means for ingress and egress to and from said chamber, means for admitting and exhausting air to and from said chamber, a weighted skirt extending downwardly below the bottom of said bell to enter the submerged surface and stabilize the bell during the taking of geophysical measurements, a combination support and anchor means secured to said bell and extending outwardly and downwardly adjacent said skirt, said means comprising tripod legs adapted to enter the submerged surface and anchor said bell during the taking of geophysical readings, and means for admitting air pressure within said skirt to release the bell from suction engagement with the submerged surface.

CLEMILLE F. SELLERS.

REFERENCES CITED

The following references are of record in the file of this patent:

UNITED STATES PATENTS

| Number | Name | Date |
|---|---|---|
| 962,019 | Flood et al | June 21, 1910 |
| 1,069,281 | O'Connor | Aug. 5, 1913 |
| 1,109,145 | Petit | Sept. 1, 1914 |
| 1,380,750 | Tesch | June 7, 1921 |
| 1,415,661 | Lemon | May 9, 1922 |
| 1,681,533 | Giliasso | Aug. 21, 1928 |
| 1,916,294 | Bacinich | July 4, 1933 |
| 2,210,408 | Henry | Aug. 6, 1940 |